United States Patent
Goodman et al.

(10) Patent No.: US 7,200,722 B2
(45) Date of Patent: Apr. 3, 2007

(54) REDUCING INVENTORY AFTER MEDIA ACCESS IN AN AUTOMATED DATA STORAGE LIBRARY

(75) Inventors: Brian Gerard Goodman, Tucson, AZ (US); Leonard George Jesionowski, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/853,630

(22) Filed: May 24, 2004

(65) Prior Publication Data

US 2005/0261800 A1    Nov. 24, 2005

(51) Int. Cl.
G06F 12/00 (2006.01)
(52) U.S. Cl. .................. 711/154; 711/112; 711/114
(58) Field of Classification Search ............... 711/112, 711/114, 154
See application file for complete search history.

(56) References Cited

U.S. PATENT DOCUMENTS

| | | | |
|---|---|---|---|
| 5,377,121 A | 12/1994 | Dimitri et al. | |
| 5,870,732 A | 2/1999 | Fisher et al. | |
| 5,883,864 A | 3/1999 | Saliba | |
| 6,286,079 B1 | 9/2001 | Basham et al. | |
| 6,513,101 B1 | 1/2003 | Fisher et al. | |
| 6,574,641 B1 | 6/2003 | Dawson et al. | |
| 6,996,673 B2 * | 2/2006 | Goodman et al. | 711/114 |

2003/0188304 A1   10/2003   Goodman et al.

FOREIGN PATENT DOCUMENTS

JP          5242656 A      4/2003

OTHER PUBLICATIONS

INSPEC: (AN-6830253) and (AN-1784127), 2 pages.
IBM TDB/RD (Aug. 2000)—"Converting a 3494 Library Housing 3590 Tape Cartridges into a 3494 Library Housing Both 3590 and LTO Tape Cartridges", 2 pages.

* cited by examiner

*Primary Examiner*—Hiep T. Nguyen
(74) *Attorney, Agent, or Firm*—John A. Griffiths; Quarles & Brady LLP (57) ABSTRACT

An automated data storage library provides for reducing inventory after media access. Media is moved, inserted, or removed without opening the access door normally associated with accessed media. A media status of a data storage drive within the automated data storage library is checked. An unexpected condition is detected at the data storage drive. An inventory of at least part of the library is performed for the unexpected condition. Alternately, a move operation is initiated for a data storage media wherein an unexpected condition is detected at the source and/or target location of the move operation. An inventory of at least part of the library is performed for the unexpected condition. In either embodiment, the unexpected condition includes a state of the automated data storage library which is inconsistent with a library database, such as a presence or absence of a data storage media in the location, or a data storage media in the location having an identifier which is inconsistent with the library database. The automated data storage library is brought back on-line after performing the inventory.

30 Claims, 7 Drawing Sheets

REDUCING INVENTORY AFTER MEDIA ACCESS IN AN AUTOMATED DATA STORAGE LIBRARY

FIELD OF THE INVENTION

The present invention relates to automated data storage libraries, and more particularly, to an automated data storage library and method of reducing the time to inventory data storage media after a frame door has been opened.

BACKGROUND OF THE INVENTION

Certain high-end computer systems often need very large mass storage capacity. In such systems, the mass storage media or devices are housed within one or more cabinets or frames, each containing banks or columns of storage shelves and drive units. The data storage media includes devices such as magnetic media (magnetic tape or disks), optical media (optical tape or disks), and electronic media (PROM, EEPROM, flash PROM). The data storage media are generally contained within modular cartridges, which may be stored in one of the storage shelves or slots when not in use. When a particular data media is needed or selected by the computer system, a robot accessor retrieves the selected data storage cartridge from the storage shelves and inserts it into an available data storage drive for access by the computer system. It may be necessary to return one of the cartridges, which is not presently in use, from the drive units back to the storage shelves, to make room for the selected cartridge.

The combination of one or more frames containing the mass storage media constitutes an automated data storage library. The mass storage system may be arranged in multiple libraries. The data storage media are logically and physically arranged in the frame(s) and library(ies) for efficient configuration and access. The modular cartridges are easily and readily movable between the storage slots and drive units to provide more overall data storage capacity and convenience of maintenance.

As part of routine operations, the automated data storage libraries commonly perform an inventory operation wherein the library reads identifying information about the data storage media, as well as the physical and/or logical locations of the media within the library, in order to verify the contents and configuration of the library. Each cartridge or data storage media has an identifier. The library provides such inventory information to a host computer upon request. An inventory of the entire library is usually performed after power-on or reset operation. A partial or re-inventory of individual frames is performed when a specific frame door has been opened, and subsequently closed, indicating some level of access to the data storage media within the frame. The inventory process involves updating and confirming an inventory database, which keeps track of the cartridges within each frame and the present location of each cartridge within a given frame. The inventory operation is time consuming and disruptive to the library operations and, as such, should be performed only when necessary.

The physical implementation and arrangement of the frames are such that it is possible for a technician or operator to open the door of one frame and reach around or through the frame interface to move, insert, remove, or otherwise access a data storage media contained within an adjacent frame, without opening the door of the adjacent frame. Because the door of the adjacent cabinet has not been opened, there is nothing to indicate that any media contained within the adjacent frame has been accessed or changed. Consequently, the inventory database for the library shows that the adjacent frame and its data storage media are intact and untouched. This type of undetected access can cause disruption to library operations because the inventory reported to the host computer, as well as the inventory maintained by the library, does not match the actual state of the library.

One solution involves the use of path sensors to tell when an area of the library has changed. For example, an optical emitter/detector pair may create a beam of light across a group of storage slots. A break in the beam indicates that the media may have been moved, inserted, or removed from the group of storage slots. One problem with the optical detector solution is the additional cost of installing and maintaining the emitters, detectors, cabling, mounting and interface circuits, which is compounded with large libraries that would require a correspondingly large number of such emitter/detector pairs. The emitter/detector pairs often require periodic alignment and cleaning to remove accumulation of foreign particles from the light lenses and sensors. The potential for failure of the emitters, detectors, cabling, connectors, and interface circuits creates an ongoing maintenance issue.

Another solution is to provide an inventory of one or both adjacent frames, as a matter of procedure, when a particular frame door has been opened. The process of inventorying two or more frames, when only one frame door is opened, increases the associated re-inventory time. Most data storage libraries use competitive comparisons, which includes a measure of how quickly the system can perform an inventory operation and get back on-line after an open frame door is detected. Any solution that materially increases inventory time is not desirable.

Another approach is to provide a manual inventory selector, such as an operator panel control, that allows the operator or technician to manually schedule re-inventory of adjacent frames when another frame door has been opened. However, the manual selection to inventory certain frames involves human action and may be forgotten or missed because of training issues. As a result, the manual selection is not likely to be made until after the library has already been disrupted by the media change. As customer expectations move toward a continuous availability of the library, i.e., the well known "24×7" goal, it is increasingly important that routine user interaction with the library does not unnecessarily disrupt host/library operations.

What is needed is a method to prevent disruption to host/library operation after media has been moved, inserted, or removed from a frame adjacent to a frame that has experienced a door open and closure, without affecting nominal library performance, and without requiring foresight on the part of the customer to anticipate such inventory errors.

SUMMARY OF THE INVENTION

An automated data storage library detects an unexpected condition at one or more storage slots and/or data storage drives. The unexpected condition may involve detecting a storage or drive location that is empty when the library inventory record indicates that the location contains a cartridge, or detecting that a storage or drive location contains a cartridge when the library expects the location to be empty. Alternatively, the storage location may contain a cartridge having a particular identifier that is different than that recorded from the library database. Upon detecting the unexpected condition, the library inventories the location associated with the unexpected condition and then brings the effected data storage location back on-line.

In one embodiment, the invention is a method of reducing inventory time in an automated data storage library comprising initiating a move operation for a data storage media within the automated data storage library, detecting an unexpected condition at a location associated with the move operation, and performing an inventory of at least the location associated with the unexpected condition.

In another embodiment, the invention is a method of reducing inventory time in an automated data storage library comprising opening and closing an access door of a first frame of an automated data storage library, checking media status of a data storage drive within a second frame of the automated data storage library, detecting an unexpected condition at the data storage drive within the second frame, and performing an inventory of at least the data storage drive within the second frame.

In another embodiment, the invention is a computer program product usable with a programmable computer processor having a computer readable program code embodied therein for reducing inventory time in an automated data storage library comprising computer readable program code which initiates a move operation for a data storage media within the automated data storage library, computer readable program code which detects an unexpected condition at a location associated with the move operation, and computer readable program code which performs an inventory of at least the location associated with the unexpected condition.

In yet another embodiment, the invention is a computer program product usable with a programmable computer processor having a computer readable program code embodied therein for reducing inventory time in an automated data storage library comprising computer readable program code which detects that a door of a first frame of an automated data storage library has been accessed, computer readable program code which checks media status of a data storage drive within a second frame of the automated data storage library, computer readable program code which detects an unexpected condition at the data storage drive within the second frame, and computer readable program code which performs an inventory of at least the data storage drive within the second frame.

DETAILED DESCRIPTION OF THE INVENTION

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims.

The invention is described as embodied in an automated magnetic tape library storage system for use in a data processing environment. Although the invention shown uses magnetic tape cartridges, one skilled in the art will recognize that the invention also applies to optical disk cartridges or other removable storage media and the use of either different types of cartridges or cartridges of the same type having different characteristics. Furthermore, the description of an automated magnetic tape storage system is not meant to limit the invention to magnetic tape data processing applications as the invention herein can be applied to any media storage and cartridge handling systems in general.

High-end computer systems often need very large mass storage capacity. In such systems, the mass storage media or devices are housed within one or more cabinets or frames, each containing banks or columns of storage shelves and drive units. The combination of one or more frames containing the mass storage media constitutes an automated data storage library.

Figure 1:
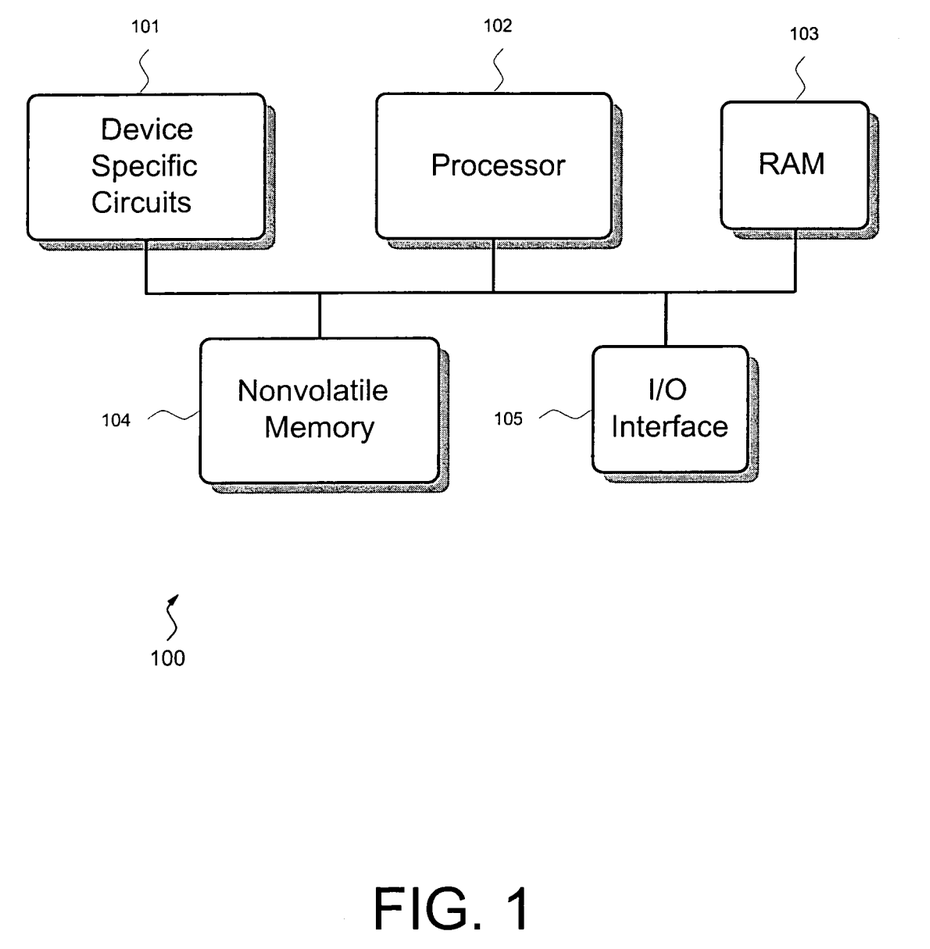
FIG. 1 is a block diagram representation of a library controller.

An automated data storage library typically comprises one or more controllers to direct the operation of the library. The controller can take many different forms and may comprise an embedded system, distributed control system, personal computer, workstation, etc. FIG. 1 shows a controller 100 with device specific circuits 101, processor 102, Random Access Memory (RAM) 103, nonvolatile memory 104, and I/O interface 105. Alternatively, RAM 103 and nonvolatile memory 104 can be contained in processor 102, as could device specific circuits 101 and I/O interface 105. Processor 102 can be implemented as a microprocessor, custom processor, Field Programmable Gate Array (FPGA), Application Specific Integrated Circuit (ASIC), or discrete logic. RAM 103 is used to hold variable data, stack data, and executable instructions. Nonvolatile memory 104 can be implemented as Programmable Read Only Memory (PROM), Electrically Erasable Programmable Read Only Memory (EEPROM), flash Programmable Read Only Memory (PROM), Magnetoresitive Random Access Memory (MRAM), battery backup RAM, hard disk drive, and the like. Nonvolatile memory 104 is used to hold the executable firmware and any nonvolatile data. I/O interface 105 is a communication interface that allows processor 102 to communicate with devices external to controller 100. Examples may include serial interfaces such as Universal Serial Bus (USB), Small Computer Systems Interface (SCSI), RS-232, and Fibre Channel. Device specific circuits 101 provide additional hardware to enable controller 100 to perform unique functions such as motor control of a cartridge gripper. Device specific circuits 101 can include electronics that provide Pulse Width Modulation (PWM) control, Analog to Digital Conversion (ADC), and Digital to Analog Conversion (DAC). In addition, all or part of device specific circuits 101 can reside outside controller 100.

Figure 2:
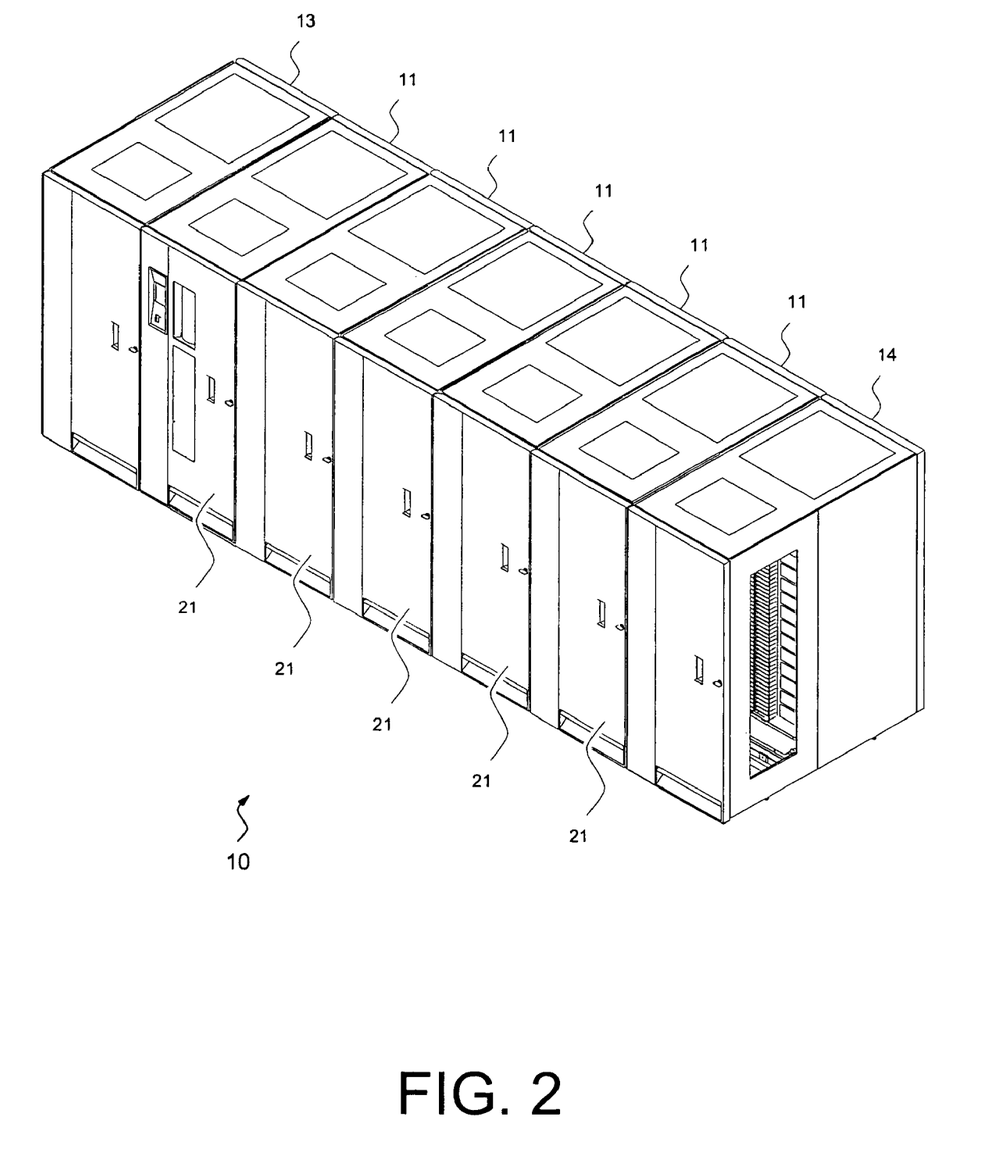
FIG. 2 illustrates an automated data storage library comprising a left-hand service bay, multiple storage frames, and a right-hand service bay.

FIG. 2 illustrates an automated data storage library 10, which contains large amounts of stored data for access by a host computer system. Automated data storage library 10 includes left-hand service bay 13, one or more storage frames 11, and right-hand service bay 14. Each frame 11 is an expansion component of library 10, i.e., frames 11 can be added or removed to expand or reduce the size and functionality of the library. The left-hand service bay 13 and/or right-hand service bay 14 are optional as will be discussed.

Figure 3:
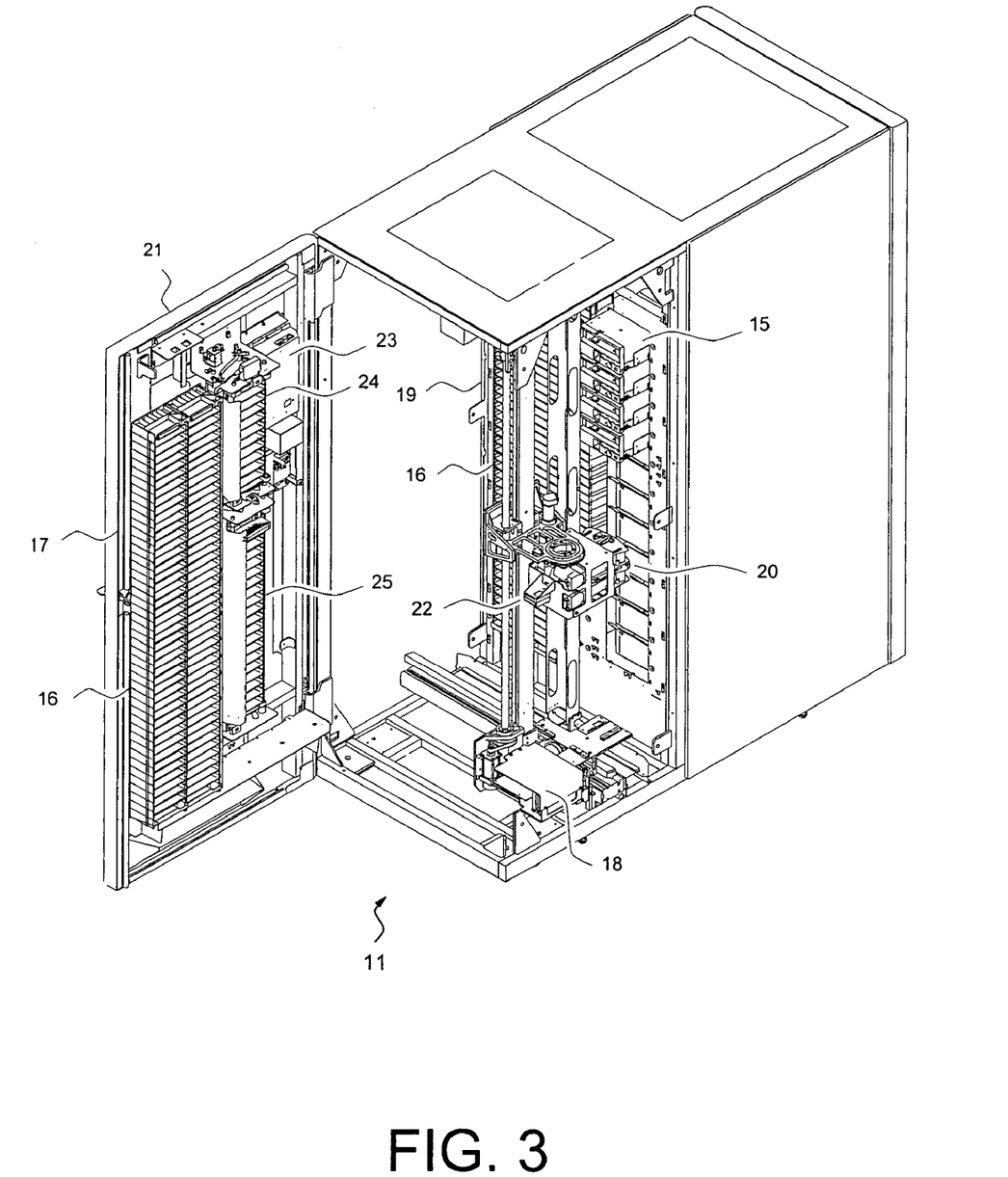
FIG. 3 illustrates one of the storage frames from the data storage library of FIG. 2.

FIG. 3 shows further detail of an interior portion of storage frame 11. In one embodiment, frame 11 constitutes a minimum configuration of automated data storage library 10. In such a minimum configuration, there are no redundant accessors or service bays. Library 10 is arranged for accessing data storage media in response to commands from one or more external host computer systems. Library 10 includes a plurality of storage shelves 16, located on front wall 17 and rear wall 19, for storing data storage cartridges that contain data storage media; data storage drives 15 for reading and/or writing data with respect to the data storage media; and accessor 18 for handling and transporting the data storage media between storage shelves 16 and data storage drives 15. Storage frame 11 includes operator control panel 23 or other user interface, such as a web-based interface, which allows the user to interact with library 10. Frame 11 also has an upper I/O station 24 and/or lower I/O station 25, which allows data storage media to be inserted into and removed from library 10, without disrupting library operations.

As shown in FIG. 2, library 10 can have multiple storage frames 11. Each storage frame 11 can be configured with different components depending upon the intended function. In the present discussion, each storage frame 11 of library 10 includes storage shelves 16, data storage drives 15, and other optional components to store and retrieve data from the data storage cartridges for the host computer system. Accessor 18 has a gripper assembly 20 for gripping one or more data storage media, and bar code scanner 22 or other reading system, such as a smart card reader, mounted on gripper 20, to read identifying information about the data storage media. The identifying information may be contained on a bar code label attached to a front surface of the data storage cartridge, or stored on the data storage media, or stored in a memory located within the data storage media cartridge.

Figure 4:
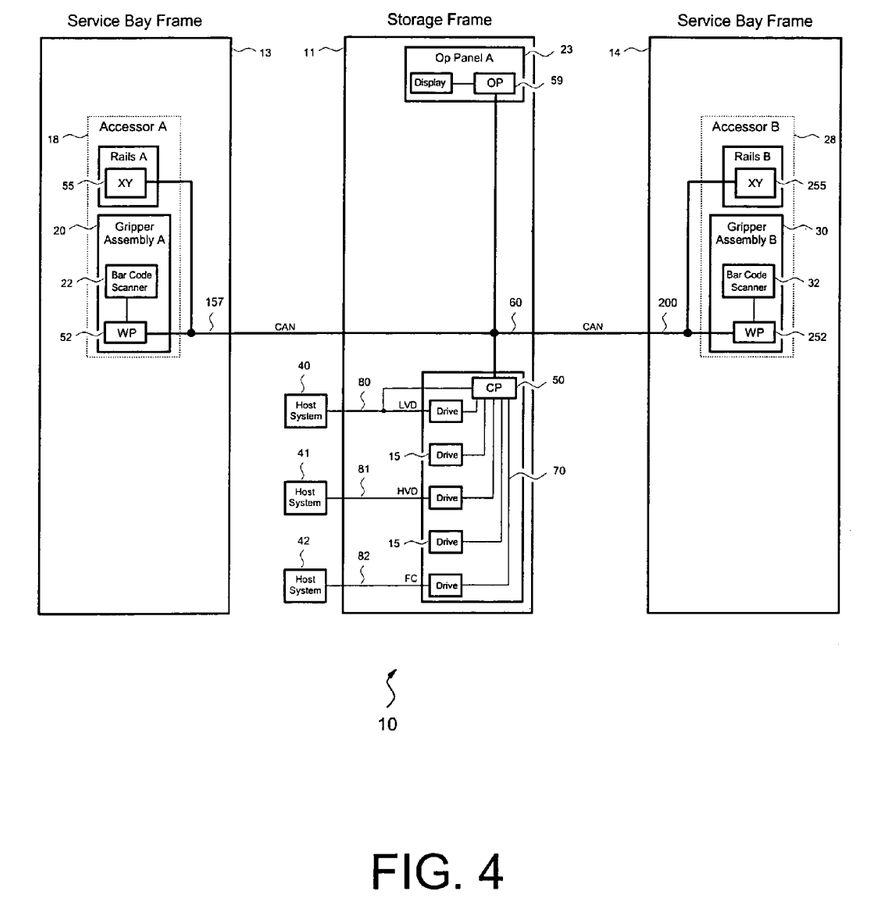
FIG. 4 illustrates an automated data storage library which employs a distributed system of processor nodes.

FIG. 4 illustrates a control aspect of automated data storage library 10, which employs a distributed system of modules with a plurality of processor nodes, such as found in the IBM 3584 UltraScalable Tape Library. Library 10 of FIG. 4 is shown with storage frame 11, left-hand service bay 13, and right-hand service bay 14. Left-hand service bay 13 is shown with accessor 18. As discussed above, accessor 18 uses gripper assembly 20 and reading system 22 to read identifying information about the data storage media. Right-hand service bay 14 is shown with accessor 28, which has a similar gripper assembly 30 and reading system 32 to read identifying information about the data storage media. In the event of a failure or unavailability of accessor 18, or its gripper 20, the second accessor 28 may perform all of the functions of the first accessor 18. The two accessors 18, 28 can share one or more mechanical paths, or they may use completely independent mechanical paths. In one embodiment, accessors 18 and 28 have a common horizontal rail with independent vertical rails.

In the exemplary library, accessor 18 or accessor 28 moves its gripper assembly in the horizontal "X" direction and vertical "Y" direction to grip and retrieve, and to deliver and release, the data storage media from storage shelves 16. In a similar manner, accessor 18 and 28 load and unload the data storage media at data storage drives 15.

Automated data storage library 10 receives commands from one or more host systems 40, 41 or 42. The host systems, such as host servers, communicate with library 10 directly by way of path 80, through one or more control ports, or through one or more data storage drives 15 on paths 81, 82. The host servers run application software and computer programs, which can be used to control library 10. The software is originally provided on computer readable media, such as compact disks (CDs), or downloaded from a vendor website, and installed on the host server. The host systems provide commands to access particular data storage media and move the media between storage shelves 16 and data storage drives 15. The commands are typically logical commands identifying the media and/or logical locations for accessing the media.

Library 10 is controlled by a distributed control system receiving the logical commands from hosts, determining the required actions, and converting the actions to physical movements of accessors 18 and 28. The distributed control system uses one or more communication processor nodes, each having one or more processors. In one example, communication processor node 50 is located in storage frame 11. The communication processor node 50 provides a communication link for receiving the host commands, either directly through line 80, or through data storage drives 15, by way of an external interface coupled to lines 81, 82. Communication processor node 50 may additionally provide one or more communication links 70 for communicating with data storage drives 15. Communication processor node 50 is located within frame 11, close to data storage drives 15.

In another example of the distributed processor system, a work processor node 52 can be located at accessor 18 and coupled to communication processor node 50 via network 60, 157. Work processor node 52 responds to commands received from any communication processor node. The work processor node 50 directs the operation of the accessor by providing move commands. XY processor node 55 is located at an XY system of accessor 18. XY processor node 55 is coupled to network 60, 157 and is responsive to the move commands for operating the XY system to position gripper assembly 20. An operator panel processor node 59 at operator control panel 23 provides an interface for communicating between the operator panel and communication processor node 50, work processor nodes 52, 252, and XY processor nodes 55, 255.

A network bus 60 is provided for communicating between the various processor nodes. The network can be a robust wiring network, such as the commercially available Controller Area Network (CAN) bus system, which is a multi-drop network, having a standard access protocol and wiring standards, as defined by CiA, CAN in Automation Association, Am Weich Selgarten 26, D-91058 Erlangen, Germany. Other networks, such as Ethernet, or a wireless network system, such as radio frequency (RF) or infrared, can be employed in library 10, as is known to those of skill in the art. In addition, multiple independent networks can also be used to couple the various processor nodes.

Communication processor node 50 is coupled to each of data storage drives 15 of storage frame 11, via lines 70, communicating with the drives and with host systems 40, 41 and 42. Alternatively, the host systems can be directly coupled to communication processor node 50, at input 80 for example, or to control port devices which connect library 10 to the host system(s) with a library interface similar to the drive/library interface. As is known to those of skill in the art, various communication arrangements can be employed for communication with the hosts and with the data storage drives. In the example of FIG. 4, host connections 80 and 81 are SCSI busses. Bus 82 can be a Fibre Channel bus, which is a high speed serial data interface, allowing transmission over greater distances than the SCSI bus systems. Data storage drives 15 are in close proximity to communication processor node 50, and therefore employ a short distance communication scheme, such as SCSI, or a serial connection, such as RS-422. Data storage drives 15 are individually coupled to communication processor node 50 by means of lines 70. Alternatively, data storage drives 15 can be coupled to communication processor node 50 through one or more networks, such as a common bus network.

Further, as described above, automated data storage library 10 can have a plurality of accessors. Accessor 28 is shown in right-hand service bay 14 of FIG. 4. Accessor 28 has a work processor node 252 which is similar to work processor node 52. Accessor 28 uses gripper assembly 30 for accessing the data storage media, and an XY system 255 for moving accessor 28. Accessor 28 can run on the same horizontal mechanical path as accessor 18, or on an adjacent path. The distributed control system additionally includes an extension network 200 forming a network coupled to network 60 of storage frames 11 and to network 157 of left-hand service bay 13.

Figure 5A:
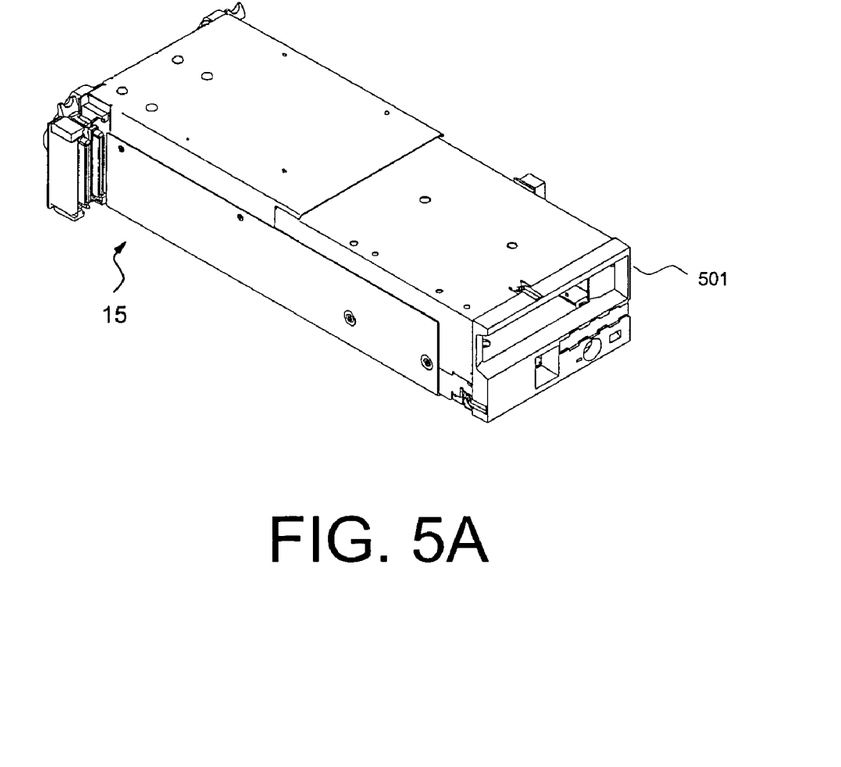
FIG. 5 illustrates a front and rear view of a data storage drive mounted in a drive canister.
Figure 5B:
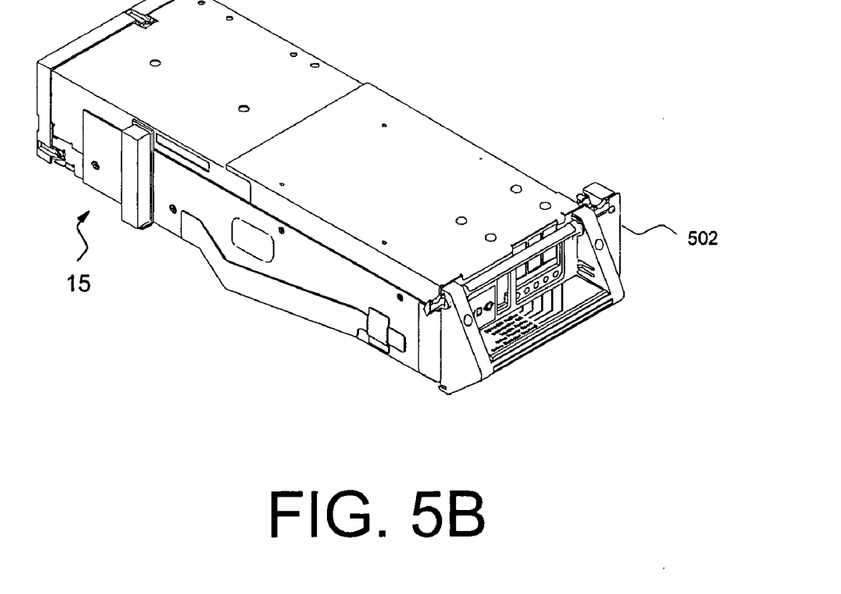

FIGS. 5a and 5b illustrate views of front 501 and rear 502 of data storage drive 15. In FIGS. 5a–5b, data storage drive 15 uses a hot-swap drive canister, although other configurations of the data storage drive can be used.

Figure 6:
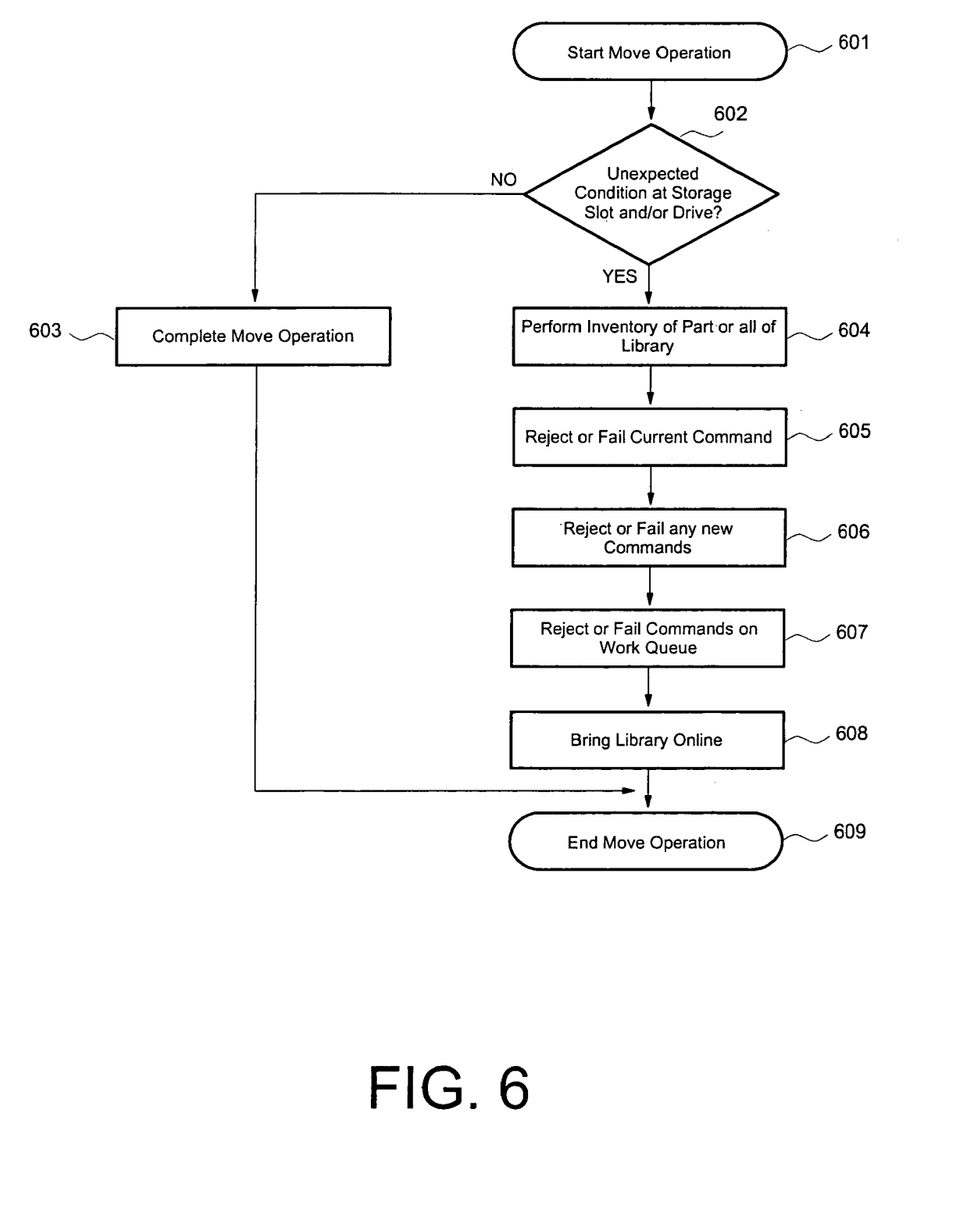
FIG. 6 is a flow chart showing the process of reducing inventory after a media access.

Turning to FIG. 6, the process of reducing the time to inventory data storage media is now described. When attempting to move media, automated data storage library 10 may experience or detect an unexpected condition at one or more of the storage slots and/or data storage drives. The unexpected condition can involve detecting a storage or drive location that is empty when library 10 expects the location to contain a cartridge, or detecting a storage or drive location that contains a cartridge when the library expects the location to be empty. Alternatively, the unexpected condition may be the case of finding a specific cartridge in a storage or drive location which is not supposed to be there, i.e., the cartridge identifier does not match the information contained in the library database. Upon detecting the unexpected condition, the library performs actions hereinafter referred to as a virtual door-open condition. The virtual door-open refers to library actions that can be seen by the host computer as a door-open and/or a door-close condition in the library. As part of the virtual door-open actions, library 10 performs an inventory of at least part of the library in order to determine the current state of drive slots and/or storage slots in the frame(s) associated with the unexpected condition. The current state can be compared to a prior state to determine the next action. The virtual door-open condition includes the steps of rejecting or failing the command that encountered the unexpected condition and optionally rejecting or failing any commands that may be in the library work queue. The commands in the work queue may be handled by library 10 before or after the unexpected condition has been resolved. The virtual door-open condition may further include the step of rejecting any new commands that are sent to the library from a host computer. Host applications typically know how to handle library door open/close conditions and request an inventory of the library after such an event. The virtual door-open operation appears to be such an event to the host computer and should therefore be non-disruptive to the library operations.

The inventory process can be better understood by referring to the flowchart of FIG. 6. A move medium operation occurs in step 601, which can be initiated by an operator, host computer, the library, or remote computer other than the host computer. The move medium operation can be a command to move the data storage media to or from a storage slot, data storage drive, accessor gripper, or an I/O station. A move command typically includes a source location where the media is being moved from, and target location where the media is being moved to. At step 602, a check is made to determine if the operation associated with the move command resulted in an unexpected state or condition. Again, an unexpected condition includes events such as detecting a storage or drive location that is empty when the library expects the location to contain a cartridge; detecting a storage or drive location that contains a cartridge when the library expects the location to be empty; and finding a cartridge having an identifier which is not as recorded in the present inventory database of library 10. For example, but without limitation, the library inventory can include cartridge identifier information obtained from a bar code label on the cartridge, or it may include similar information from a cartridge memory associated with the cartridge or the media within the cartridge. The unexpected condition may occur at the source location of a move command and/or it may occur at the target (destination) location of a move command.

The unexpected condition may be detected by the library accidentally. For example, the library may attempt to grab a cartridge and find that the storage slot or drive slot is empty. In another example, the library may attempt to place a cartridge in a storage slot or drive slot and finds that the slot already contains a cartridge. Alternatively, the unexpected condition may be detected intentionally. For example, the library may have the means to detect if a cartridge is present in a storage slot or drive slot and it may use this means to determine if a slot is empty or full. By comparing the last known state of the slot to the current state of the slot, the library can determine if the slot is in an unexpected state. In another example, the library may read a cartridge identifier of a cartridge in a drive slot, storage slot, or I/O station slot. By comparing the last known value of the cartridge identifier to the current value of the cartridge identifier, the library can determine if the slot contains an unexpected cartridge. Any of the above-described unexpected conditions can result from someone opening a frame door and changing the state of media locations in an adjacent frame or area that would normally be monitored by another door, i.e., the case of an operator reaching around or through a frame interface into an adjacent frame to access one or more cartridges. In addition, hardware or firmware errors can cause the unexpected conditions.

Referring back to FIG. 6, if the source and/or target (destination) of the move operation does not give rise to an unexpected condition, as indicated in step 602, then control moves to step 603 where the move operation is completed. The move operation then ends at step 609. If on the other hand, an unexpected condition is encountered at the source and/or target (destination) of the move operation as indicated in step 602, then control moves to step 604 where an inventory of at least part of the library is performed. For example, the library can inventory part or all of the frame that contains the drive or storage slot where the unexpected condition occurred. In another example, the library may inventory all of the frames of the library. Still further, the library may maintain enough information to know which doors have been opened since the last inventory. This information could be used to determine which frame(s) may be the opposing adjacent frame, in which case an inventory of the adjacent frames could be performed.

In one embodiment, the library maintains information or flags that indicate which frames have been inventoried since the last door open/close. All of the flags are cleared each time a door is opened and/or closed. A flag corresponding to a particular door is set when the frame is inventoried. The flags are used to prevent library 10 from performing a re-inventory of a frame that has already been inventoried and also to prevent endless inventory operations due to errors that are mistaken for unexpected conditions. At step 605, the current command is rejected or failed, i.e., the command that detected the unexpected condition. The command of step 605 is failed with status that is consistent with the status that would be returned on a command that failed because a library access door had been opened. At step 606, any new commands that are received by library 10 are rejected. The commands of step 606 are failed with status that is consistent with the status that would be returned on a command that failed because a library access door had been opened. Host computers typically know how to handle door open/close conditions and this step should not be disruptive to most host applications. At step 607, any commands in the work queue can also be rejected or failed. The commands of step 607 are failed with status that is consistent with the status that would be returned on a command that failed because a library access door had been opened. Step 607 is optional because it may be desirable to maintain the commands in the work queue until the steps of the flowchart of FIG. 6 have been completed. Referring back to FIG. 6, the library database is updated with the new inventory information and the library comes back online at step 608. The library will begin accepting move commands again and will provide host responses in a manner consistent with a library that had one or more doors previously opened but then subsequently closed. The move operation completes at step 609.

In a second embodiment, the present states of the drives are checked after a library door has been accessed to determine if an unexpected condition or state has occurred at the data storage drive. Herein, accessing a library door refers to opening and/or closing the library door. An unexpected condition at the drive can be a drive slot that is empty when library 10 expects the location to contain a cartridge, or a drive slot that contains a cartridge when the library expects the location to be empty. Alternatively, the unexpected condition is a drive slot that library 10 expects to have a cartridge with a particular identifier, but instead had a cartridge with a different identifier. Upon experiencing the unexpected condition, library 10 inventories at least part of the library. For example, library 10 can inventory the frame that contains the drive with the unexpected condition.

In this case, the unexpected condition is detected and corrected prior to any attempt to move media within the library. There is no need for a virtual door open because the unexpected condition has been detected and corrected during a normal door open event. The second embodiment may be combined with the first embodiment, as described in FIG. 6, to provide another solution. While the second embodiment is potentially less disruptive than the first embodiment, it may not catch all unexpected conditions. For example, media may have been moved, inserted, or removed from a storage slot in an adjacent frame and not from a drive in that frame. In this case, the second embodiment may not detect the unexpected condition whereas the first embodiment would.

Figure 7:
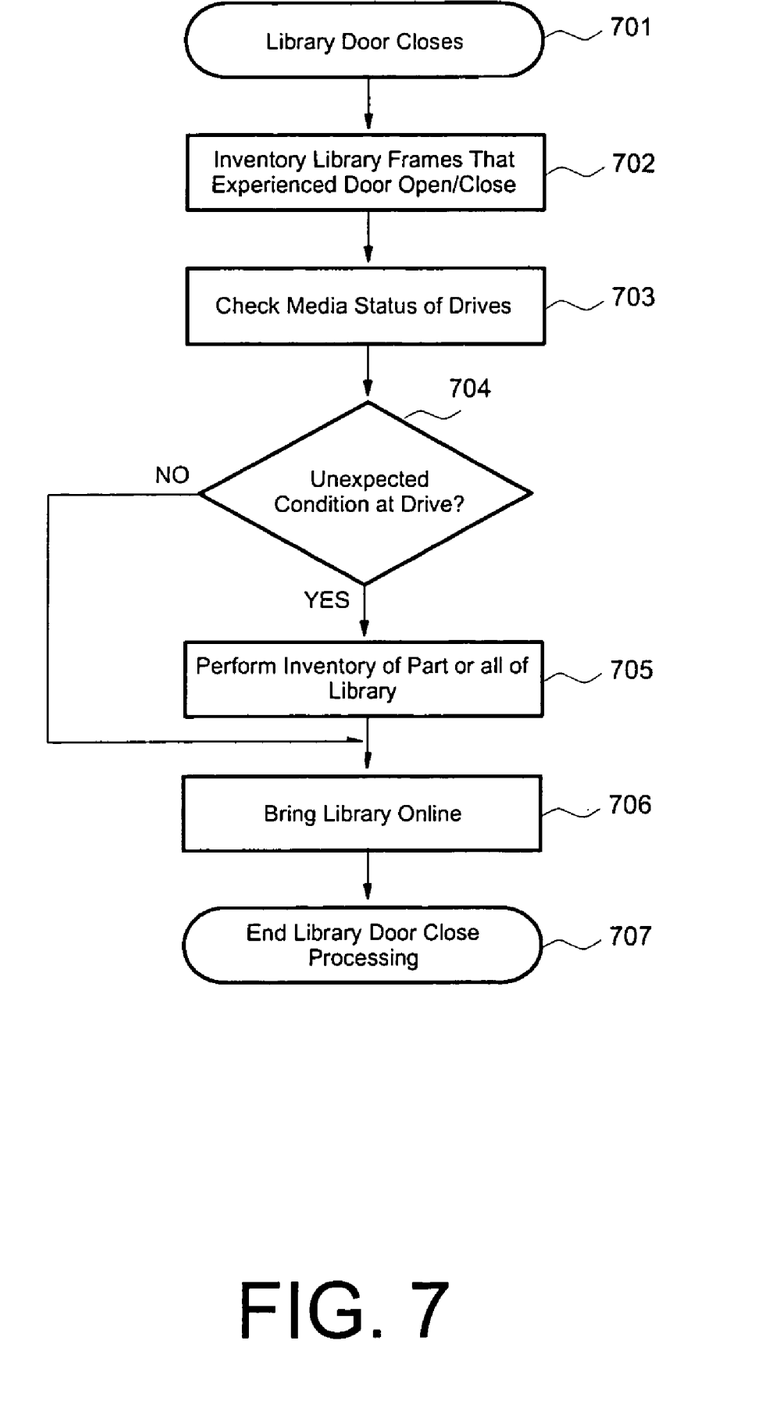
FIG. 7 is a flow chart showing an alternate process of reducing inventory after a media access.

The method of the second embodiment can be better understood by referring to the flowchart of FIG. 7. A library door closes at step 701. At step 702, library 10 performs an inventory of any frames that experienced a door open/close condition since the last inventory. Library 10 checks the media state of one or more drives at step 703. Step 703 checks drives in the frames that have not experienced a door open condition, since all other frames will go through an inventory process anyway. The library queries the drives for a status of media present. For example, the library may include a communication interface between the drive and library, such as lines 70 in FIG. 4. The drive may have the capability to tell when media is loaded, or when media is in the media feed slot. The library may use the communication interface to find out if the drive has media loaded and/or if the media feed slot contains a cartridge. This information can be used to determine if the drive slot is in an unexpected state. For example, the library cartridge database may indicate that media is present at the drive, but after polling the drive for feed slot status the library may find that media is not currently present at the drive. In another example, the library cartridge database may indicate that media is not present at the drive, but after polling the drive for feed slot status the library may find that there is currently media present at the drive. In another variation of the second embodiment, the library may obtain a media identifier from the drive. This may comprise a value of a media label, a value stored in a cartridge memory, or a value stored on the media within the cartridge. The library may maintain a copy of the identifier in a database such that the expected database value of the identifier can be compared to the actual drive status value of the identifier to determine if the drive is in an unexpected state. In another embodiment, library 10 uses a component of the library to determine the status of media presence at the drives. For example, path sensors at the drives can be used to tell when someone has accessed the area around the drives. As another example, the library can perform an inventory of the drive areas as a method of checking the media state of the drives, thus eliminating the additional time required to inventory an entire frame. In any case, by comparing the present state of the drives to their recorded state of a library database, library 10 can determine if media has been inserted into the drive, or removed from the drive, or if the media has otherwise been altered since the last frame door open/closure operation so as to be inconsistent with the library database.

Referring back to FIG. 7, if an unexpected condition has been detected at a drive as indicated at step 704, the library performs an inventory of at least part of the library at step 705. Since the state of a drive in another frame may have changed, library 10 inventories the frame containing the unexpected condition to remove any question as to the state of the media in the library. Additional inventory of frames, that would not normally be inventoried, may occur when library 10 suspects that media may have been moved, inserted, or removed from another area of the library, which will not affect library performance during normal or nominal operation. If, on the other hand, an unexpected condition has not been detected as indicated by step 704, or after completing step 705, control moves to step 706 where library 10 comes back online to the host computer. Any re-inventory is updated in the library database. In Step 706, new commands are accepted, which may have been previously rejected during normal door or inventory processing of library 10. The library door close processing completes at step 707. Since the library is performing a normal inventory from a real door open event, there should be no disruption to the host computer.

The steps of the above flowcharts can be changed, added or removed without deviating from the spirit and scope of the invention. For example, step 604 may occur anywhere between steps 602 and 608, and step 702 may occur anywhere between step 701 and step 706. The steps of FIGS. 6 and 7 are executed by the application software and computer programs running on the host servers as described above.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of reducing inventory time in an automated data storage library, comprising:
   initiating a move operation for a data storage media within the automated data storage library;
   detecting an unexpected condition at a location associated with the move operation; and
   performing an inventory of at least the location associated with the unexpected condition.

2. The method of claim 1, wherein the unexpected condition includes a state of the location which is inconsistent with a library database.

3. The method of claim 1, wherein the unexpected condition is a presence or absence of a data storage media in the location.

4. The method of claim 2, wherein the unexpected condition is a data storage media in the location having an identifier which is inconsistent with the library database.

5. The method of claim 1, further including rejecting a new command upon detecting the unexpected condition.

6. The method of claim 1, further including rejecting a current command upon detecting the unexpected condition.

7. The method of claim 1, further including rejecting a command in a work queue upon detecting the unexpected condition.

8. The method of claim 1, further including bringing the automated data storage library back on-line after performing the inventory of the location associated with the unexpected condition.

9. A method of reducing inventory time in an automated data storage library, comprising:
   opening and closing an access door of a first frame of an automated data storage library;
   checking media status of a data storage drive within a second frame of the automated data storage library;
   detecting an unexpected condition at the data storage drive within the second frame; and
   performing an inventory of at least the data storage drive within the second frame.

10. The method of claim 9, wherein the unexpected condition includes a state of the data storage drive which is inconsistent with a library database.

11. The method of claim 10, wherein the unexpected condition is a data storage media at the data storage drive having an identifier which is inconsistent with the library database.

12. The method of claim 9, wherein the unexpected condition is a presence or absence of a data storage media at the data storage drive.

13. A computer program product comprising:
   a computer usable medium having a computer readable program code embodied therein for reducing inventory time in an automated data storage library, said computer program product including:
      computer readable program code which initiates a move operation for a data storage media within the automated data storage library;
      computer readable program code which detects an unexpected condition at a location associated with the move operation; and
      computer readable program code which performs an inventory of at least the location associated with the unexpected condition.

14. The computer program product of claim 13, wherein the unexpected condition includes a state of the location which is inconsistent with a library database.

15. The computer program product of claim 14, wherein the unexpected condition is a data storage media in the location having an identifier which is inconsistent with the library database.

16. The computer program product of claim 13, wherein the unexpected condition is a presence or absence of a data storage media in the location.

17. The computer program product of claim 13, further including computer readable program code which brings the automated data storage library back on-line after performing the inventory of the location associated with the unexpected condition.

18. A computer program product comprising:
   a computer usable medium having a computer readable program code embodied therein for reducing inventory time in an automated data storage library, said computer program product including:
      computer readable program code which detects that a door of a first frame of an automated data storage library has been accessed;
      computer readable program code which checks media status of a data storage drive within a second frame of the automated data storage library;
      computer readable program code which detects an unexpected condition at the data storage drive within the second frame; and
      computer readable program code which performs an inventory of at least the data storage drive within the second frame.

19. The computer program product of claim 18, wherein the unexpected condition includes a state of the data storage drive which is inconsistent with a library database.

20. The computer program product of claim 19, wherein the unexpected condition is a data storage media at the data storage drive having an identifier which is inconsistent with the library database.

21. The computer program product of claim 18, wherein the unexpected condition is a presence or absence of a data storage media at the data storage drive.

22. A computer program product comprising:
   a computer usable medium having a computer readable program code embodied therein for reducing inventory time in an automated data storage library, said computer program product including:
      computer readable program code which initiates a move operation for a data storage media within the automated data storage library;
      computer readable program code which detects an unexpected condition at a location associated with the move operation; and
      computer readable program code which performs an inventory of at least the location associated with the unexpected condition.

23. The computer program product of claim 22, wherein the unexpected condition includes a state of the automated data storage library Which is inconsistent with a library database.

24. The computer program product of claim 23, wherein the unexpected condition is a data storage media in the location having an identifier which is inconsistent with the library database.

25. The computer program product of claim 22, wherein the unexpected condition is a presence or absence of a data storage media in the location.

26. The computer program product of claim 22, further including computer readable program code which performs an inventory of data storage media within a second frame of the automated data storage library.

27. An automated data storage library, comprising:
means for opening and closing an access door of a first frame of an automated data storage library;
means for checking media status of a data storage drive within a second frame of the automated data storage library;
means for detecting an unexpected condition at the data storage drive within the second frame; and
means for performing an inventory of at least the data storage drive within the second frame.

28. The automated data storage library of claim 27, wherein the unexpected condition includes a state of the data storage drive which is inconsistent with a library database.

29. The automated data storage library of claim 28, wherein the unexpected condition is a data storage media at the data storage drive having an identifier which is inconsistent with the library database.

30. The automated data storage library of claim 27, wherein the unexpected condition is a presence or absence of a data storage media at the data storage drive.

* * * * *